United States Patent [19]

Trojani

[11] 4,300,630
[45] Nov. 17, 1981

[54] FINNED METAL TUBE AND METHOD FOR MAKING THE SAME

[76] Inventor: Benito L. Trojani, via Polar, 8 - Lugano-Breganzona (Svizzera), Italy

[21] Appl. No.: 863,486

[22] Filed: Dec. 22, 1977

[30] Foreign Application Priority Data

Jan. 28, 1977 [IT] Italy .................. 19736 A/77

[51] Int. Cl.² ........................... F28F 1/38
[52] U.S. Cl. ................................. 165/181
[58] Field of Search .............. 165/181, 185, 179, 180; 122/367 C, 367 A

[56] References Cited

U.S. PATENT DOCUMENTS

| | | | |
|---|---|---|---|
| 1,929,444 | 10/1933 | Murray et al. | 165/181 |
| 2,004,252 | 6/1935 | Sorensen | 165/179 |
| 2,181,927 | 12/1939 | Townsend | 165/181 |
| 2,566,318 | 9/1951 | Dalin et al. | 165/181 |
| 3,041,262 | 6/1962 | Jens | 165/180 |
| 3,930,941 | 1/1976 | Meerwald et al. | 165/181 |

FOREIGN PATENT DOCUMENTS

| | | | |
|---|---|---|---|
| 665521 | 9/1929 | France | 165/148 |
| 770139 | 9/1934 | France | 122/367 A |

*Primary Examiner*—Sheldon Richter
*Attorney, Agent, or Firm*—William A. Drucker

[57] ABSTRACT

A heat exchanger element has a metal tube with fins disposed radially and in rows, to increase the heat exchange surface. The improvement of the invention is that the fins are of elliptical cross section and are arranged in rows which are equally spaced, the major axes of the respective cross sections of the fins in a row being parallel, and being parallel to or at 90° or at 45° to the tube axis, each fin in a row being staggered with respect to the corresponding fins of the adjoining rows. For welding such fins to the tube, there is used a hollow electrode having its inner cavity of substantially cross-like shape and corresponding to the combined outline of two fins having the major axes of their cross section inclined at 90°.

3 Claims, 9 Drawing Figures

FINNED METAL TUBE AND METHOD FOR MAKING THE SAME

The present invention relates to an improved finned metal tube or pipe and, more particularly, it relates to a finned metal tube especially adapted for making heat exchangers for heating and cooling systems, chemical and oil systems, nuclear power stations and in general for cooling or heating chemical materials or compositions, and a method for making such a finned tube.

It is known that, for heating or cooling liquid materials or gases, there are generally used tubes or pipes which have their outer surfaces provided with fins or spokes, generally of a metallic material, the function of said fins being to increase the thermal exchange surface.

It is also known that, in order to increase the number of fins per unit of area of the tube, and hence the radiating surface thereof, it has been suggested to use fins having elliptical, rectangular or elongated cross sections, and to locate said fins in a row in such a manner that the axis or long side of the respective cross section of each said fin is inclined at 90° with respect to the axis or long side of the adjoining fins.

SUMMARY OF THE INVENTION

The applicant has found that a lower fluid flow resistance, and an improved thermal exchange or transfer, are obtained by using a finned metal tube having its outer surface provided with a plurality of radial fins or spokes of elliptical cross section arranged in rows equally spaced along the entire surface length, wherein the major axes of the cross sections of the fins located in each row are mutually parallel and extend parallely or at 90° or 45° with respect to the tube axis, the fin of each row being staggered with respect to the corresponding fins of the adjoining rows.

In the particular case in which the major axes of the cross sections of the fins located in the row are inclined at 45° with respect to the tube axis, it is preferred that the major axes of the cross sections of the fins of the adjoining rows shall be inclined at 90° with respect to the former, i.e. at 45° but in an opposing direction with respect to the tube axis.

The fins are joined by welding using hollow electrodes, having their outer cavities of substantially cross-like shape and corresponding to the outer profile of two fins arranged with the major axes of their cross section mutually inclined at 90°.

BRIEF DESCRIPTION OF THE DRAWINGS

For the better understanding of the present invention, some embodiments thereof are hereinafter described with reference to the accompanying drawings wherein.

Figure 1:
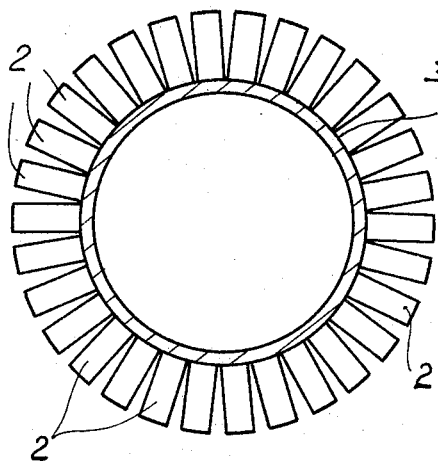
FIG. 1 shows a cross section, and a partial elevation of a first embodiment of a finned tube according to the invention.
Figure 1:
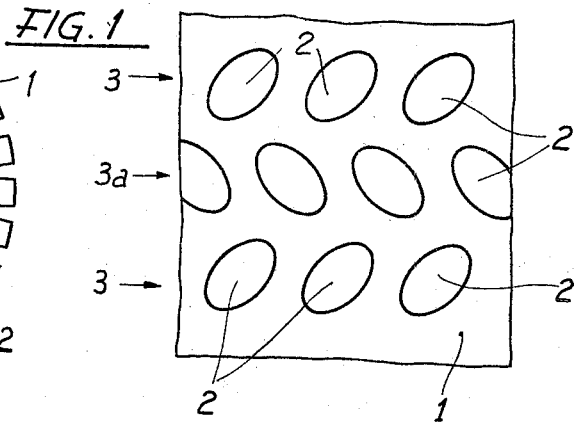

In the drawing, the reference numeral 1 indicates the outer surface of a metal tube, and 2 denotes fins or spokes, of elliptical cross section, radially disposed on said surface.

In the embodiment illustrated in FIG. 1, the fins are fixed in a plurality of parallel circumferential rows 3, 3a located at regular intervals along the entire length of the surface 1 of the tube.

In each row 3 or 3a, the fins 2 are disposed in such a manner that the major axes of the respective cross sections are mutually parallel and inclined at 45° with respect to the axis of the tube.

The fins 2 of each row 3a are staggered with respect to the fins 2 of the adjoining rows; moreover the major axes of the cross sections of the fins of each row, for example those of the row 3a, may be inclined at 90° with respect to the major axes of cross sections of the corresponding fins of the adjoining rows, i.e. the rows 3, as is shown in FIG. 1.

Figure 2:
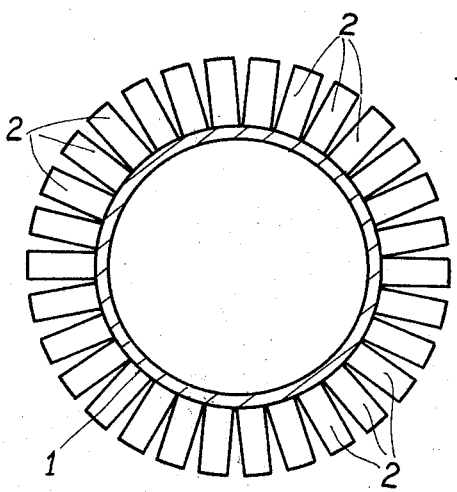
FIG. 2 shows a cross section, and a partial elevation of a second embodiment of finned tube according to the present invention.
Figure 2:
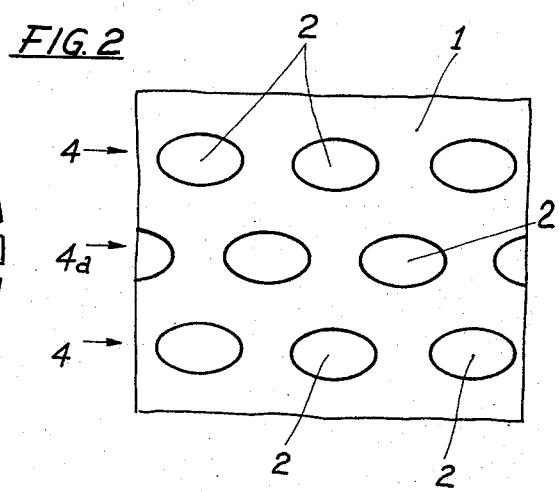

In a second embodiment of the invention, as illustrated in FIG. 2, the fins 2 are again fixed in a plurality of parallel circumferential rows 4, 4a disposed at equal intervals along the entire length of the surface 1, but with the major axes of the respective cross sections mutually parallel and inclined at 90° with respect to the axial direction of the tube.

Moreover the staggered relationship of the fins of a row, for example the row 4a, with respect to the fins of the adjoining rows 4, is preserved.

Figure 3:
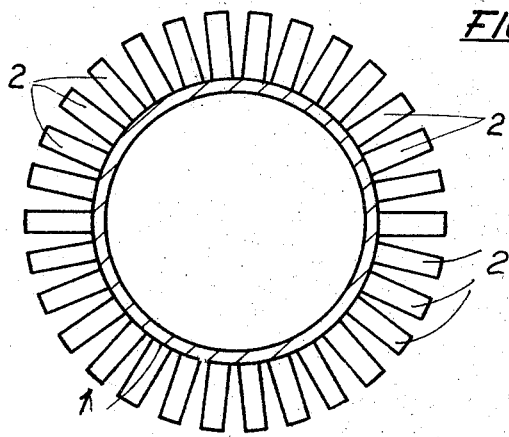
FIG. 3 shows a cross section and a partial elevation of another embodiment of finned tube of the present invention.
Figure 3:
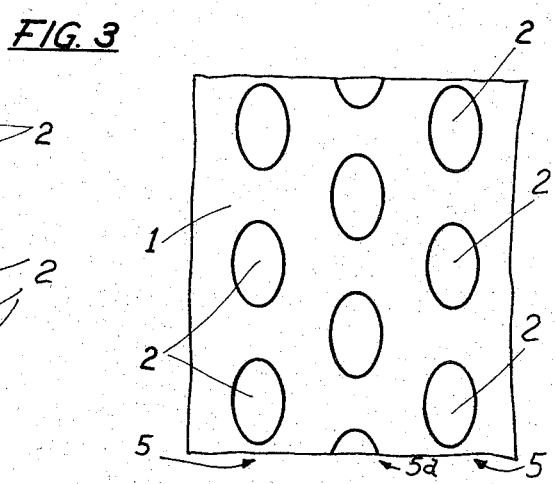
Figure 4:
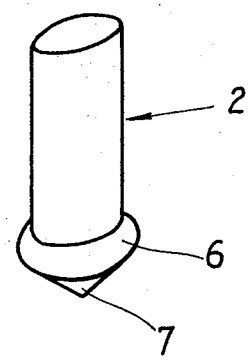
FIG. 4 shows a perspective view of a fin or spoke.

In a third embodiment of the present invention as illustrated in FIG. 3, the fins 2 instead of being arranged in circumferential rows, are located according to parallel axially extending rows, 5, 5a which encircle the tube, the major axes of the cross sections of the fins 2 being also orientated according to an axial direction, i.e. being parallel to the tube axis.

Also in this embodiment, the fins of each row, for example the row 5a, are staggered with respect to the fins of the adjoining rows 5.

For fixing the fins 2 to the outer surface 1 of a tube, each fin 2 is provided at one end with a collar 6 having a conical end portion 7 adapted to be fixed on the tube surface 1.

The fixing is carried out by welding, according to known methods, by using hollow electrodes 8, having their inner cavities of a substantially cross-like shape and corresponding to the outer combined outline of two fins 2 arranged with their major axes mutually inclined at 90°.

Figure 5:
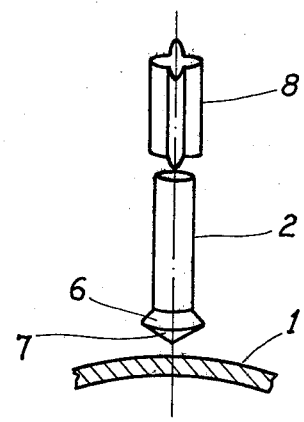
FIGS. 5 and 6 show a schematic perspective view of a hollow electrode for welding the fins, said electrode being illustrated respectively near a fin, before welding, and pressing said fin during the welding step.
Figure 6:
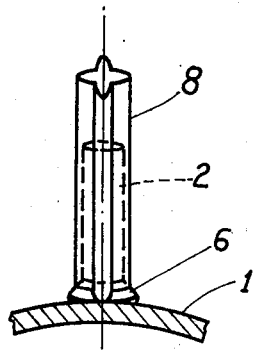
Figure 7:
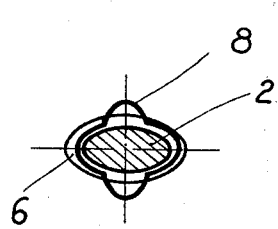
FIG. 7 is a cross sectional view of FIG. 6.
Figure 8:
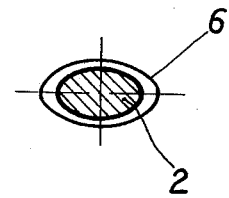
FIG. 8 is a cross sectional view of the fin of FIG. 4.
Figure 9:
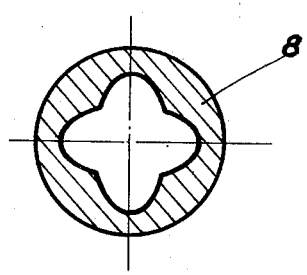
FIG. 9 shows a cross sectional view of the hollow electrode.

For fixing the fins 2 to the surface 1 of the tube, the electrodes 8 are brought coaxially adjacent to the fins 2, as illustrated in FIG. 5, and then they are engaged over these latter, as illustrated in FIG. 6, until they press against the collar 6.

While the conical portions 7 are maintained against the surface 1, welding is carried out according to well known methods.

The cross-like section of the cavity of each electrode allows for the successive fixing of alternate fins having their cross sections mutually perpendicular, the need for rotating the electrode about its axis thereby being avoided.

The welding of the fins 2 may be carried out by any type of conventional machine for the welding of fins.

Thus, for example, the tube may be fixed, at its ends, to one pole of a welding machine and rotated stepwise while the electrodes 8 are mounted on two oppositely-acting pneumatic cylinders. Each electrode 8, when pushed by the respective pneumatic cylinder, engages the collar 6, pushing the fin 2 against the surface 1 of the tube. The welding of the fin 2 to the surface 1 of the tube is carried out after having driven the conical portion 7 into said surface 1.

The finned tube according to the present invention has the outstanding advantage of presenting to the fluid, flowing about the tube and between the fins 2, a resistance which is lower than that of known finned tubes. The fins 2 are so shaped and mutually orientated with respect to the tube axis, that they prevent the occurrence in the fluid of swirls or other perturbations.

Moreover the thermal exchange is markedly increased with respect to that which may be obtained with the known finned tubes.

The invention is not limited to the embodiments described and illustrated, and modifications and variations may be made within the scope of the appended claims.

I claim:
1. A heat exchanger element comprising:
 (i) a metal tube having a cylindrical outer surface and a coaxial cylindrical plain inner surface,
 (ii) a plurality of fins secured to and extending radially from the outer surface of the tube, said fins being of elliptical cross-section, said fins being arranged in rows which are equally spaced over the entire outer surface of the tube, the fins of each row being staggered with respect to the corresponding fins of the adjoining rows, the fins of each row having their respective major axes mutually parallel and at 45° with respect to the tube axis, the fins of each row having their respective major axes at 90° to the respective major axes of the fins of adjoining rows.
2. A heat exchanger element, as claimed in claim 1 wherein the fins are arranged in a plurality of axially-spaced rows which extend circumferentially of the tube.
3. A heat exchanger element, as claimed in claim 1, wherein the fins are arranged in a plurality of circumferentially-spaced rows which extend axially of the tube.

* * * * *